United States Patent

[11] 3,612,771

[72] Inventor Paul Victor Caniquit
Essonne, France

[21] Appl. No. 845,754
[22] Filed July 29, 1969
[45] Patented Oct. 12, 1971
[73] Assignee S. A. Telecommunications Radioelectriques et Telephoniques T.R.T.
Paris, France
[32] Priority Aug. 9, 1968
[33] France
[31] 162505

[54] DUAL-BAND LINE TRANSMISSION SYSTEM
8 Claims, 11 Drawing Figs.

[52] U.S. Cl. .......... 179/15 BP
[51] Int. Cl. .......... H04j 1/14
[50] Field of Search .......... 179/15 BL, 15 AD, 170 A, 170 C

[56] References Cited

UNITED STATES PATENTS 2,768,353 10/1956 Mansson .......... 179/170 X A

*Primary Examiner*—Ralph D. Blakeslee
*Attorney*—Frank R. Trifari

ABSTRACT: A transmission system has two terminal stations and at least one repeater station. One terminal station transmits a first pilot signal which is passed through the repeater station without effecting any amplitude control devices. The second terminal station transmits a second pilot signal, which is time modulated by the received first pilot signal, and is used to control amplitude control devices. Therefore, both frequency independent and dependent attenuators can be compensated.

INVENTOR.
PAUL V. CANIQUIT
BY
[signature]
AGENT

INVENTOR.
PAUL V. CANIQUIT
BY
AGENT

INVENTOR.
PAUL V. CANIQUIT
BY
[signature]
AGENT

INVENTOR.
PAUL V. CANIQUIT
BY
Frank R. Trifari
AGENT

INVENTOR.
PAUL V. CANIQUIT
BY
AGENT

INVENTOR.
PAUL V. CANIQUIT
BY
Frank R. Trifari
AGENT

INVENTOR.
BY PAUL V. CANIQUIT
Frank R. Trifari
AGENT

DUAL-BAND LINE TRANSMISSION SYSTEM

The invention relates to a dual-band line transmission system comprising two terminal stations adapted to transmit signals in a high-frequency band and signals in a low-frequency band respectively, and furthermore comprising in the transmission line repeaters for amplifying the two signal bands, one or more of the repeaters comprising a level control device formed by an attenuation regulator and a slope regulator, each of the terminal stations transmitting together with the signal band a pilot signal $P_1$ and $P_2$, respectively, originating from a pilot generator, for controlling the attenuation and slope regulators in said repeaters having a level control device in dependence upon the transmitted pilot signals.

In known transmission systems of this kind the adjustment is performed by means of a number of continuously operating regulators in a closed loop, which, however, gives rise to difficulties in the dynamic stabilization of the whole system.

The invention has for its object to provide in the first place a simpler arrangement which further permits of performing automatically and accurately the slope correction control in each line connection independently of the number of repeaters involved.

The arrangement according to the invention is characterized in that the pilot signal $P_1$ transmitted by one of the terminal stations is transmitted without controlling a level control device in the repeaters having a level control device towards the associated terminal stations, the latter comprising a pilot receiver for the pilot signal $P_1$ whose output controls a time modulator connected to the pilot signal generator $P_2$ for producing a time-modulated pilot signal $P_2$, which is transmitted through the line both for attenuation correction and slope correction in the repeaters having attenuation regulators and slope regulators, while in the latter repeaters the time-modulated pilot signal is applied to a level detector and a time modulation detector for controlling the level control devices formed by the attenuation regulators and the slope regulators.

In the transmission systems in accordance with the invention only one continuously operating regulator is employed in a closed loop so that the difficulties involved in the dynamic stabilization of a chain of regulators are obviated; there need in particular be considered only the amplification of the envelope in the last line control section.

The time modulators and time detector employed are preferably formed by a frequency modulator and a frequency detector respectively, but it is also possible to employ time modulators and time detectors of a different type, for example, pulse duration modulated and pulse duration detectors, PCM modulators and PCM detectors and the like.

The invention and its advantages will be described more fully with reference to the FIGURES, in which FIG. 1 is a block diagram of the two terminal stations O and E of a transmission system in accordance with the invention, interconnected by ($n-1$) repeaters.

Figure 4:
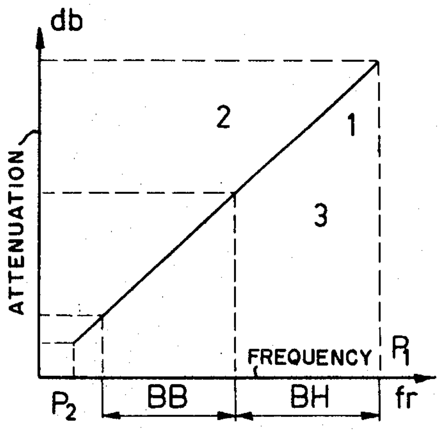

FIG. 4 illustrates the attenuation-versus-frequency curve of a transmission line section between two consecutive repeaters for a carrier operating at a reference temperature (curve 1) and at a higher or lower temperature (curves 2 and 3).

Figure 5:
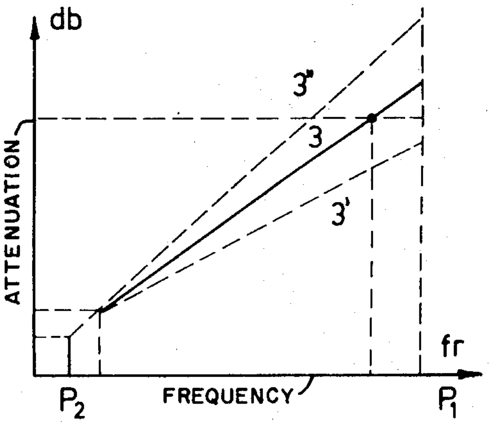

FIG. 5 illustrates a slope correction to be performed by the pilot signal $P_1$.

Figure 6A:
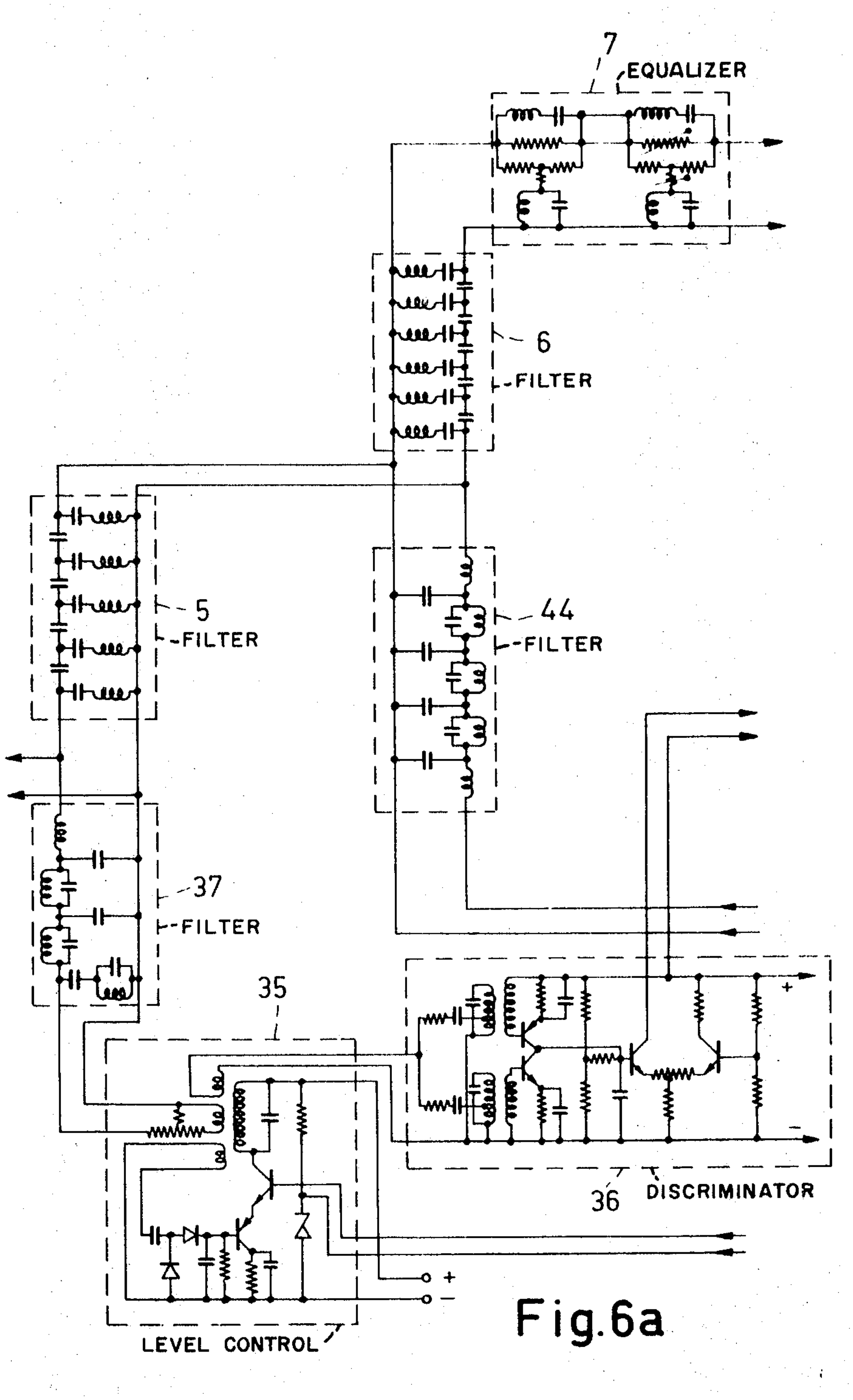
Figure 6B:
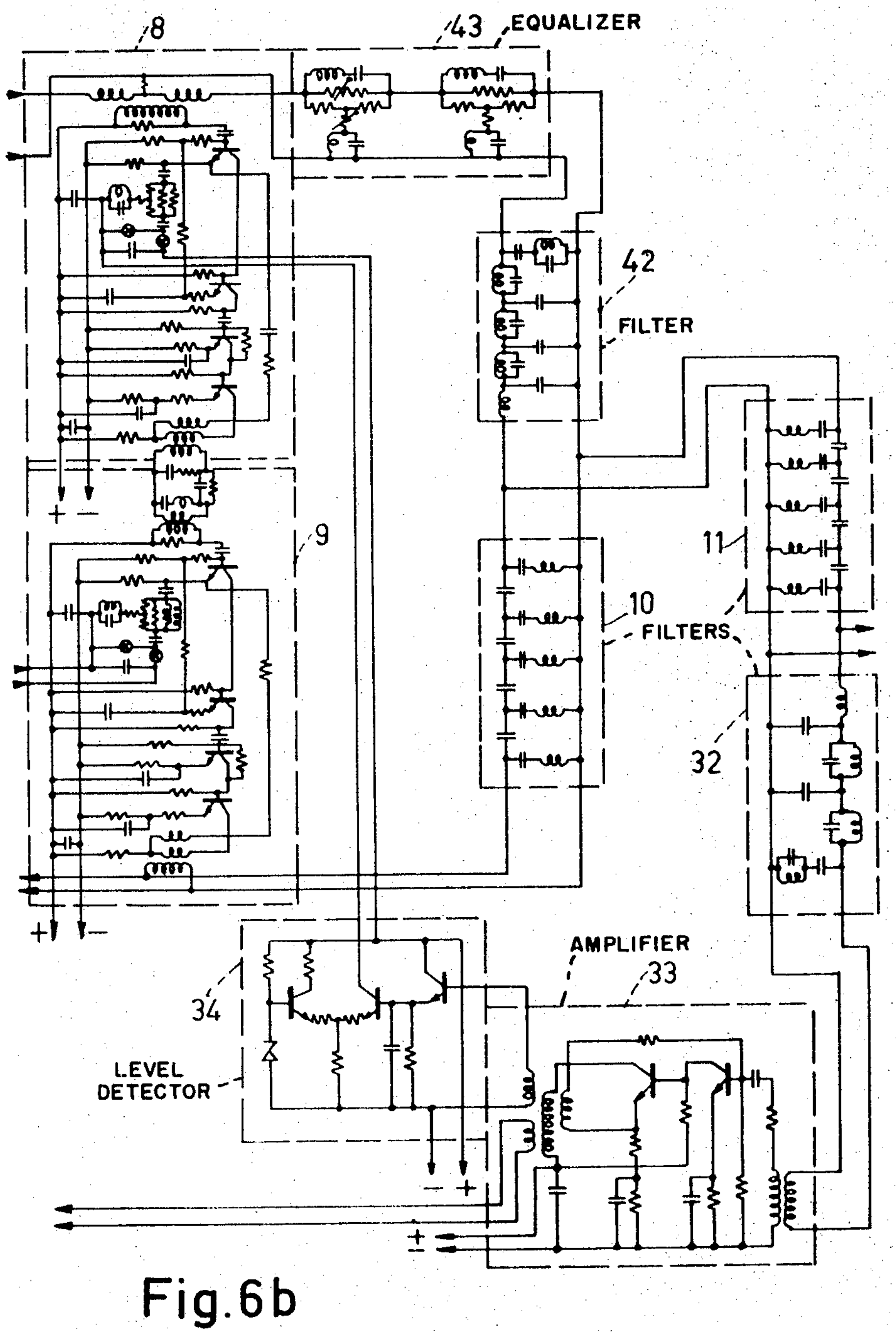

FIGS. 6*a* and 6*b* show the diagram of a repeater in a system in accordance with the invention.

Figure 2:
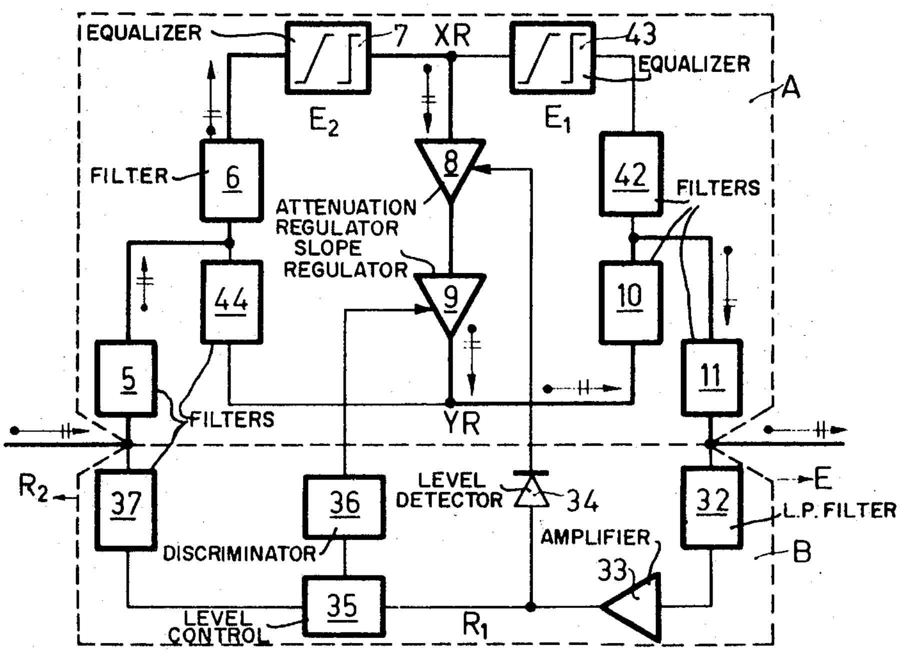
FIG. 2 is a block diagram of a repeater $R_1$ of FIG. 1 in accordance with the invention, in which the path of the pilot signal $P_1$ which is transmitted together with the signals of the high-frequency band is indicated in the direction O–E.
Figure 3:
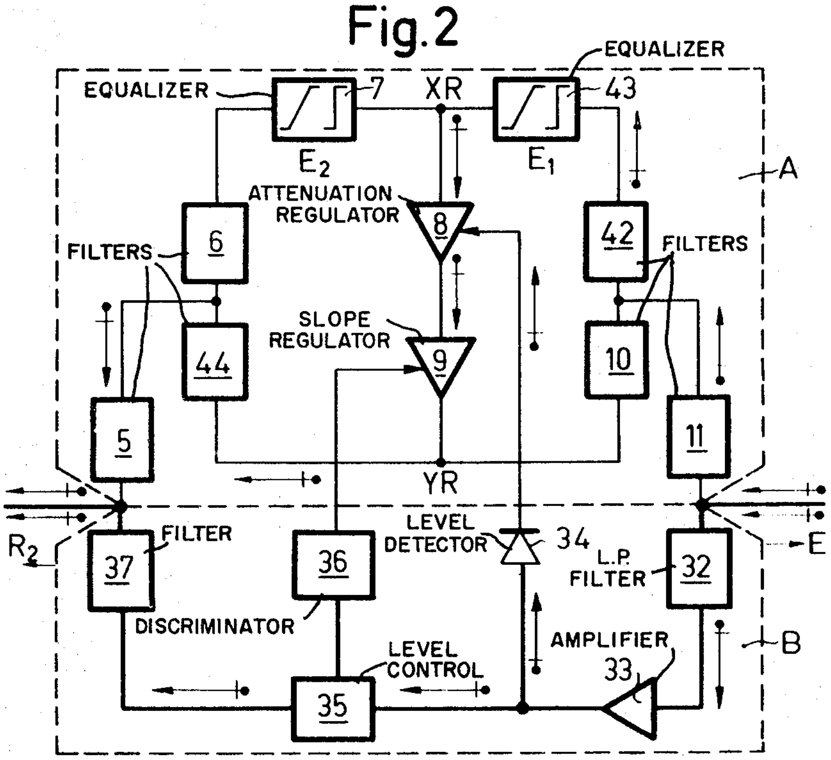
FIG. 3 is a diagram of the repeater of FIG. 2 indicating the paths of the pilot signal $P_2$ and the signals of the low-frequency band in the direction E–O.

The line amplification temperature control and slope correction devices are outlined by a dotted line and the references are the same as those of FIGS. 2 and 3.

Figure 1:
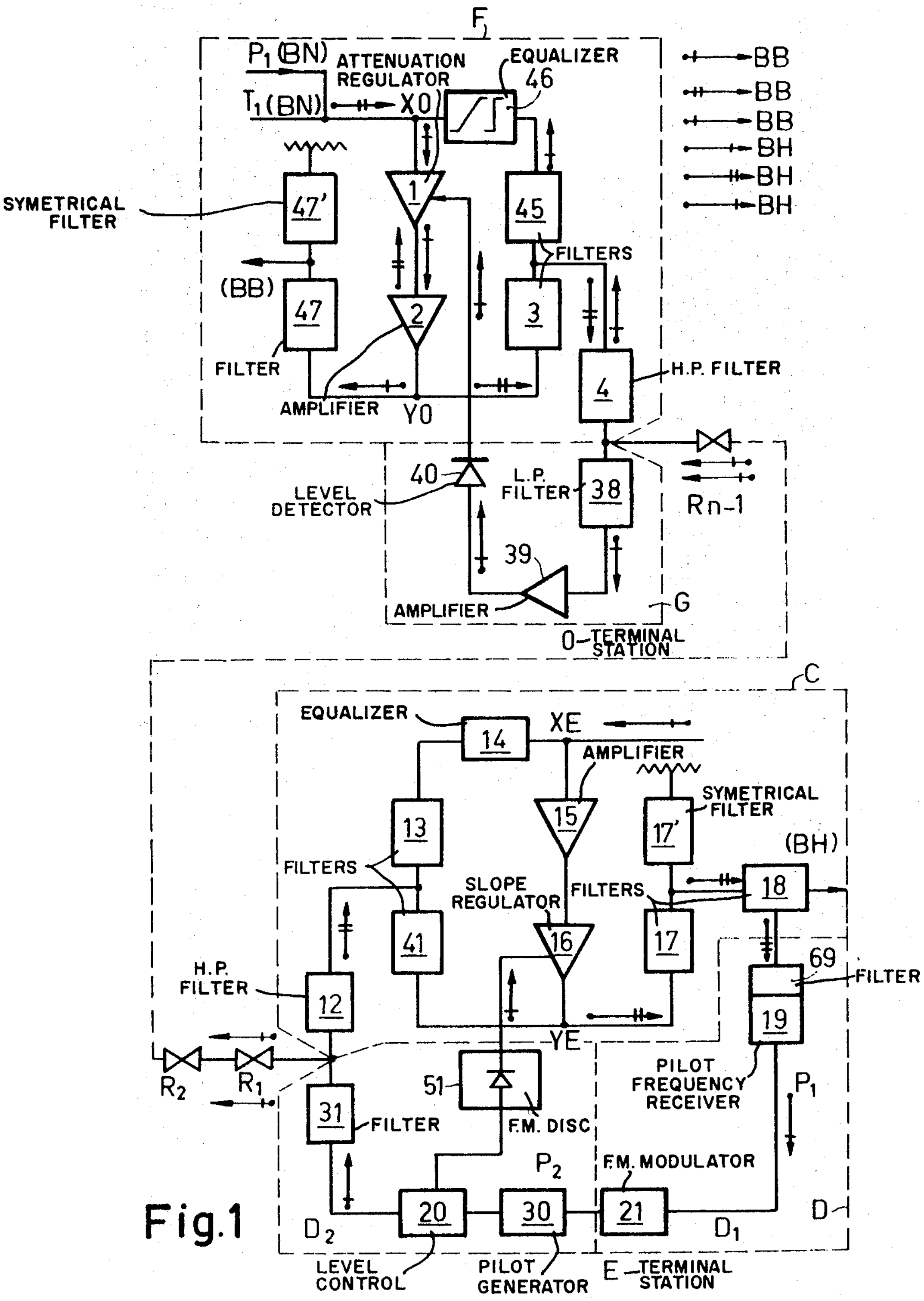
Figure 7:
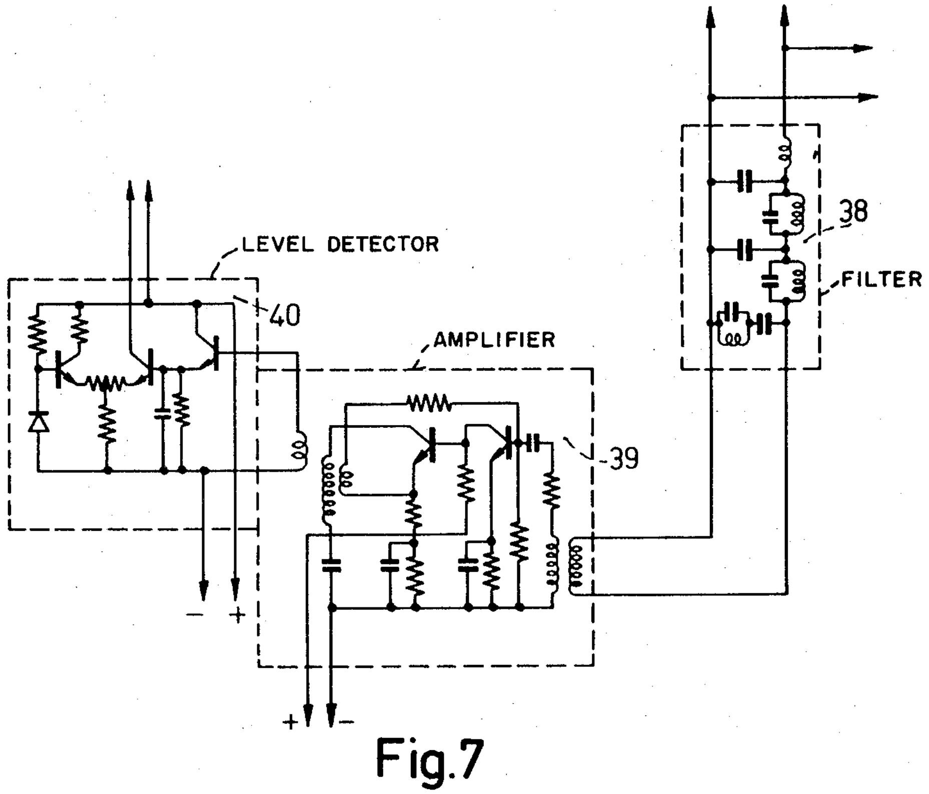

FIG. 7 shows the diagram of the temperature control devices 38, 39, 40 of the terminal station O (see FIG. 1).

Figure 8:
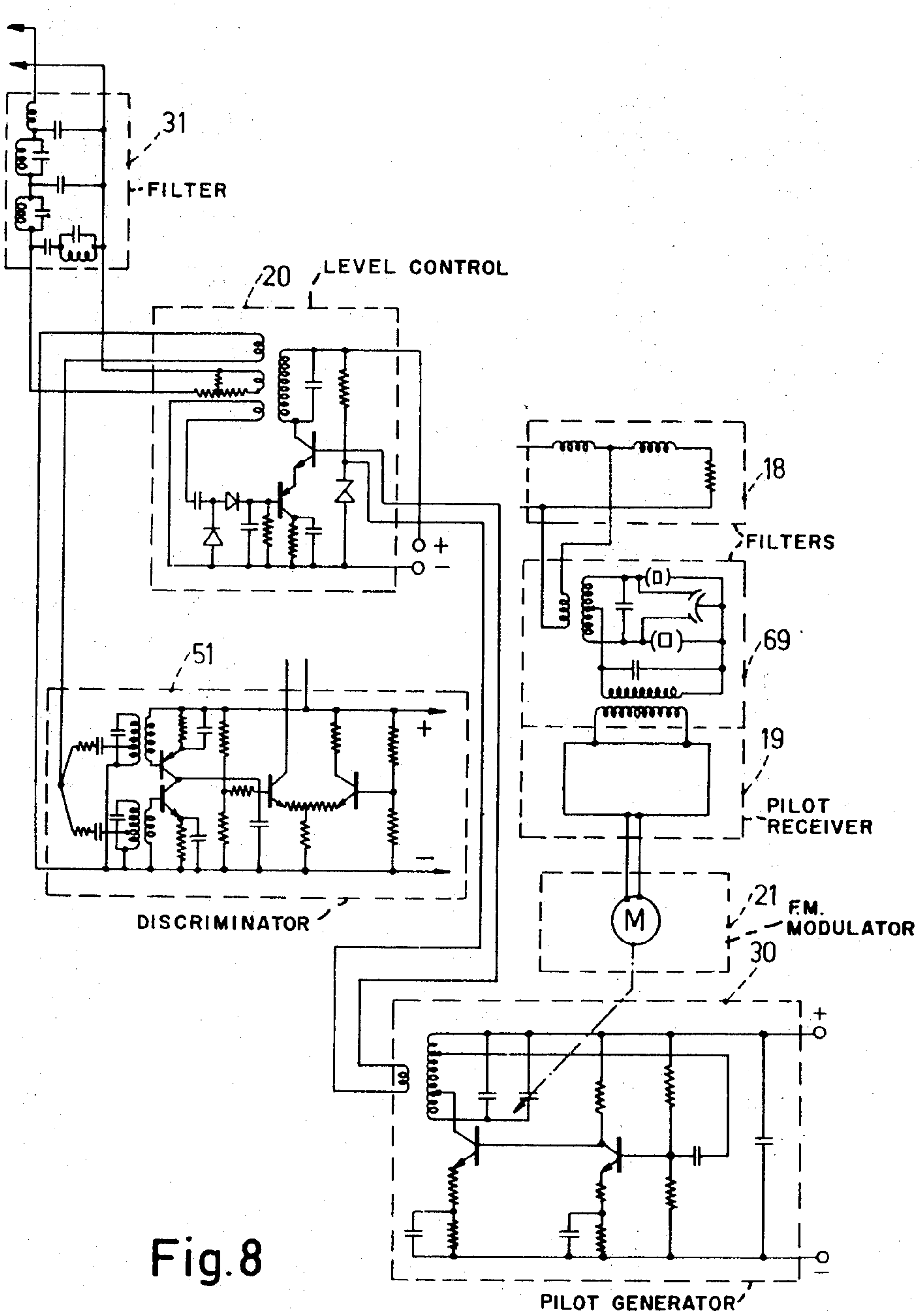

FIG. 8 shows the diagram of the portion corresponding with the portion D of the terminal station E of FIG. 1, the devices outlined by dotted lines being designated in the same way.

Figure 9:
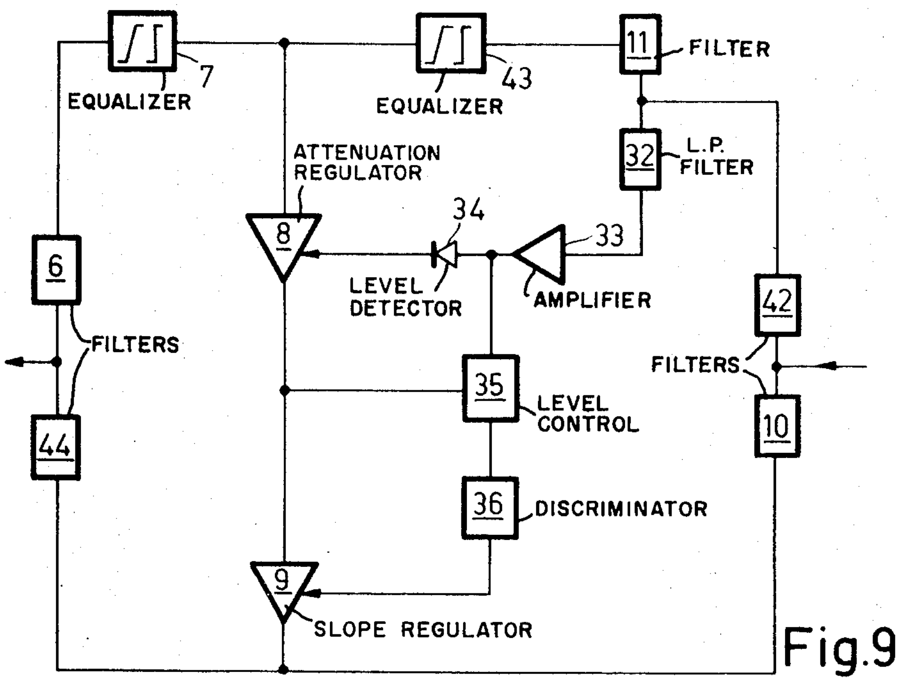

FIG. 9 shows the diagram of a variant of the repeater $R_1$ of FIGS. 2 and 3 in accordance with the invention.

Figure 10:
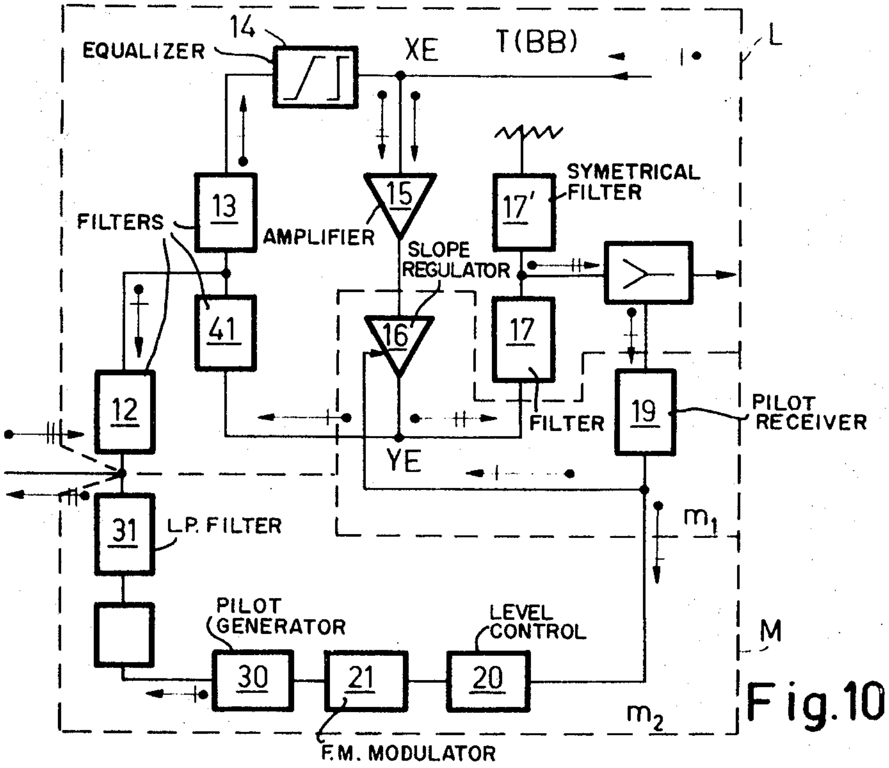

FIG. 10 shows the diagram of a variant of the terminal station E of the transmission system shown in FIG. 1.

The terminal station E of FIG. 1 transmits a frequency band BB and a pilot frequency $P_2$ lying in the lower part of the bands BB, the band BB and the pilot frequency $P_2$ following different paths.

The frequency band is received at the point XE, traverses the amplifier BH–BB (15), the amplifier BH–BB forming the slope regulator 16, arrives at point YE, is blocked by the filter BH(17) and passes through the filter BB(41); since with respect to the pilot frequency $P_2$ this band is high, it passes through the high-pass filter 12 and transverses the line in the direction towards the input of the first repeater $R_1$.

In each repeater the band BB passes in known manner a chain identical to that of the subportion A of the repeater $R_1$ and composed as follows (see FIGS. 2 and 3):

A filter BB (42) (a high-pass filter in respect of the pilot frequency $P_2$), an amplifier BB (43), point X*r*, amplifier BH–BB, temperature control device 8, amplifier BH–BB as a slop regulator 9, point Y*r*, filter BB (44), filter 5 (high-pass filter in respect of the pilot frequency $P_2$).

In the other terminal station O (see FIG. 1) the band BB arrives through the filter 4 (high-pass filter like 5), passes through the split apart filter 45, the equalizer BB (46), point X*o*, amplifier BH–BB as an attenuation regulator (1), amplifier BH–BB (2), point Y*o*, filter BB (47) compensated by the symmetrical filter BH(47′), and enters the receiver BB.

The pilot frequency $P_2$ from the generator B (30) of the terminal station E is applied to the line through a low-pass filter 31 in the direction E–O and covers the path formed by the subportions B of the repeaters.

All repeaters traversed are identical.

The subportion B of the repeater $R_1$ (see FIGS. 2 and 3) comprises the following members: low-pass filter 32, amplifier 33, whose output is connected to the level detector 34, which is connected to the amplifier BH–BB (8) as an attenuation regulator in series with said amplifier 33, connected as a level control device 35, from which a discriminator 36 is branched, whose output supplies direct current to the amplifier BH–BB as a slope regulator 9; an output filter BB (37) is connected in series with said control 35.

In the terminal station O said pilot frequency $P_2$ traverses a subportion G comprising in series a low-pass filter 38, an amplifier 39 and a level detector 40 and feeds the amplifier BH–BB(1) as an attenuation regulator.

The generator of the pilot frequency $P_2$(30) of the terminal station E (see FIG. 1) transmits through the line in the direction to $R_1$ via the level control device 20 and the filter 31 said frequency $P_2$ and feeds the slope correction amplifier 16 via the discriminator 51, which is connected in parallel at 20.

After having passed the first amplifying section the pilot frequency $P_2$ is applied through the low-pass filter 32 to the amplifier 33 of the first repeater $R_1$ (see FIG. 2), which puts the signal on an appropriate level. After detection in the detector 34 the resultant direct current is supplied to the amplifier 8. When the first amplifying section is operating under nominal conditions of temperature, the amplification-temperature curve of the amplifier 8 is linear, which means that 8 and 34 are controlled so that 8 exhibits the same gain for all frequencies between $f_{max}$ and $f_{main}$.

If the temperature of the first amplifying section fluctuates, the attenuation-frequency curve of the transmission line varies and hence also the level of the pilot frequency $P_2$, which acts upon the amplifier 8 through 34. This level variation produces a variation of the gain of the amplifier 8 so that at all frequencies between $f_{min}$ and $f_{max}$, this gain compensates the fluctuation of the attenuation of the first amplifying section (FIG. 4).

Since the amplifier 8 is common to the two transmission directions of bands BH and BB respectively will be obvious that:

1. the temperature control is a post-regulation for the low-frequency band, which means that owing to the amplifier 8 the frequencies of this band are transmitted with a constant level from the output of 8, since the gain variations of 8 compensate the attenuation variations of the line section traversed by the low-frequency band;
2. the temperature control is a preregulation for the high-frequency band, which means that the gain variations of 8 compensate the attenuation variations of the frequencies of this band during passage through the first amplifying section which is the last one for these frequencies.

Therefore, the level of the high-frequency band BH is variable at the output of the amplifier 8; the deviation from the nominal output level and the level at the instant $t$ is equal to the attenuation variation of the first amplifying section between the nominal value and the value at the instant $t$. The attenuation variation of the first amplifying section fluctuates with the frequency so that the output level of 8 is different for each of the frequencies of the high-frequency band.

It thus appears that in the direction O–E the output level of 8 is raised or lowered for each frequency of BH by the value of the increase or decrease of the attenuation of the first amplifying section relative to the nominal attenuation. Consequently at the input of the terminal station E the receiving level of the high-frequency band is independent of the attenuation variations in the first amplifying section owing to temperature fluctuations.

In the direction E–O a level control device 35 provided in each subportion B of the repeater at the output of the amplifier 33 provides a constant level of the pilot signal $P_2$ independently of the attenuation variations of the first amplifying section so that at the output of the low-pass filter 37 the level of $P_2$ is equal to that of the low-pass filter 37 the level of $P_2$ is equal to that of the low-pass filter 31 of the terminal station E.

What is said for the first amplifying section also applies to the second amplifying section, the repeater $R_1$ being substituted for the station E and the repeater $R_2$ for the repeater $R_1$ with respect to temperature fluctuations and so on for all identical amplifiers.

The $n^{th}$ amplifying section lies between the repeater elements $R_{n11}$ and the terminal station O, where a group of elements 39–40 and (1) is provided identical to the group of elements 33–34 and (8) of the repeater $R_1$, these elements having the same functions. In a chain of $n$ amplifying sections $n$ dual-band amplifiers of the type of 8 are provided as attenuation regulators compensating the attenuation variations of a section due to temperature fluctuations.

The output level of the amplifier 1 is equal to the nominal level and remains so at each frequency of the low-frequency band BB.

The output level of the amplifier 15 of the terminal station E is equal to the nominal level and remains so at each frequency of the high-frequency band BH so that a satisfactory control of the attenuation variations of the carrier due to temperature fluctuations is obtained.

As stated above the pilot frequency $P_1$, transmitted together with the high-frequency band BH, traverses all parts A of the repeaters and the portions F and C of the terminal stations O and E. Since the pilot frequency $P_2$ does not traverse any of these portions, the level of the pilot frequency $P_1$ indicates the difference between the attenuation of the line and the amplification of the portions A, F and C at the maximum frequency, whereas the level of the pilot frequency $P_2$ indicates only the attenuation of an amplifying section at the frequency $f_{min}$.

In the terminal station E at the output of the filter 69, which separates the pilot frequency $P_1$ from the frequencies of the transmitted high-frequency band BH, the difference between the level of the pilot frequency at the instant $t$ and the normal level (when the line attenuation is at nominal value, i.e. under atmospheric reference conditions) represents the difference throughout the line between the sum of the gains of the $n$ repeaters and the sum of the attenuation of the $n$ amplifying sections.

$\Delta$ indicates either the correction error of the $n$ amplifiers BH–BB of the type 8, when only the line attenuation has changed due to temperature or the effect of other disturbing factors than temperature, for example, humidity of ice deposition.

$\Delta$ is the sum of the differences $\Delta_i$ (FIG. 5) between the theoretic attenuation of the first amplifying section and the actual attenuation at the pilot frequency $P_1$.

The pilot frequency receiver $P_1$ (19) compares in known manner the level of the pilot signal $P_1$ with a reference signal. As soon as the level of the incoming signal differs from the reference level by a predetermined value $Q$, the resultant signal indicating that this difference $Q$ is reached acts upon the generator of the pilot signal $P_2$ (30) whose frequency is changed by means of the frequency modulator 21 via the shaft of a motor M (FIG. 8).

This frequency change is detected in the frequency detector 51 and acts upon the slope correction amplifier 16. Since the pilot signal $P_2$ is transmitted in the direction towards the repeater $R_1$ through the line, the frequency difference has the same effect in each of the ($n$—1) repeaters.

Each of the slope correction amplifiers such as 16 and 9 corrects, under the influence of the frequency variation of the pilot frequency $P_2$ in accordance with the invention, a difference equal to $\Delta/n$ at the frequency of the pilot signal $P_1$, while the gain of these amplifiers at the pilot frequency $P_2$ is maintained unchanged (see FIG. 5). Consequently, at the input of the pilot receiver 19 the signal of the pilot frequency $P_1$ is reset to its nominal level since each of the ($n$—1) repeaters performs a correction of $\Delta/n$, while the amplifier 16 corrects the value $\Delta/n$.

This means that $(n-1)\ \Delta/n+\Delta/n=\Delta$.

The slope variations of the line may be positive or negative with respect to the reference curve so that the pilot receiver 19 is capable of correcting also a slope variation of $-\Delta/n$ and the above also applies when is replaced by $-\Delta$.

The amplifier 16 compensates in the incoming high-frequency band the slope variation of the preceding line section: the slope regulation is therefore a post regulation for the frequencies of the transmitted high-frequency band. This also applies to the repeaters.

Owing to the amplifier 16 the low-frequency band is transmitted with a slope variation relative to the nominal slope, which is equal to and opposite the slope variation of the frequencies of the low-frequency band BB during the passage through the first amplifying section. The slope regulation is therefore a preregulation for the frequencies of the low-frequency band. These frequencies pass in the same manner through the ($n$—1) repeaters.

A first variant of the automatic control device in accordance with the invention consists in omitting the double high and low-pass filters such as 37 in all repeaters (5 in repeater 1 of FIGS. 2 and 3) so that the circuit arrangement shown in FIG. 9 is obtained. From this Figure it will be obvious (the references correspond with those of the preceding Figures) that the operation is identical to that of the repeater $R_1$, since the gain of the amplifier 9 remains the same at the frequency $P_2$.

This variant may of course be employed in the terminal stations O and E.

A second variant of the automatic control device in accordance with the invention consists in replacing the circuitry of the subportion D of the terminal station E of FIG. 1 by the circuitry of a subportion M of the terminal station E of FIG. 10.

The portion M of this circuitry includes the pilot receiver $P_1$(19), which controls in series the input of the pilot generator $P_2$ (30) through a threshold member 20 and a frequency modulator 21.

The pilot frequency $P_2$ thus adjusted is introduced into the line in the direction towards the repeater $R_1$ after having passed a level control device and a low-pass filter 31.

The output of the pilot receiver 2 is connected to the second input of the slope correction amplifier 16 so that the loop of the filter 17, the receiver BH(18) with the pilot receiver 19 and the amplifier 16 is closed.

The diagrams show clearly the identical functions of the portions $D_1$ and $D_2$ of the subportion D of the terminal station E of FIG. 1 and of the portions $M_1$ and $M_2$ of the subportion M of the terminal station E of FIG. 10.

I claim:

1. A transmission system comprising a first terminal station for transmitting information signals in a high-frequency band including means for generating a first pilot signal; a repeater station coupled to said first terminal station including an attenuation regulator, a slope regulator, a level detector means coupled to receive only a second pilot signal and coupled to one of said regulators for control of said regulator in accordance with said second pilot signal, a time modulation detector means coupled to receive only a second pilot signal and coupled to said remaining regulator for controlling said regulator in accordance with said second pilot signal, and means for passing said first pilot signal through said repeater station without said first pilot signal controlling any regulators thereof; and a second terminal station coupled to said repeater station for transmitting information in a low-frequency band including a receiver for said first pilot signal, a time modulator coupled to said receiver, and a means for generating a second pilot signal coupled to said modulator for time modulation of said second pilot signal; whereby said second pilot signal controls said repeater station regulators.

2. A system as claimed in claim 1 wherein said first and second pilot signals have frequencies above the upper limit of said high-frequency band and below the lower limit of said low-frequency band respectively.

3. A system as claimed in claim 1 wherein said time modulator and said time modulator detector comprise a frequency modulator and a frequency demodulator respectively.

4. A system as claimed in claim 1 wherein said level and time modulator detectors are coupled to said attenuation and slope regulators respectively.

5. A system as claimed in claim 2 wherein said second terminal station further comprises a low-pass filter coupled to said second pilot signal generating means; said repeater station further comprising a series circuit including a first repeater low-pass filter coupled to receive said second pilot signal, an amplifier coupled to said repeater low-pass filter, a level control device coupled to said amplifier, and a second repeater low-pass filter; said level detector being coupled between said amplifier and said attenuation regulator, and said time modulation detector being coupled between said level control device and said slope regulator; and said first terminal station further comprising an attenuation regulator, a low-pass filter coupled to receive said second pilot signal, an amplifier coupled to said first station low-pass filter and a level detector coupled between said first station amplifier and said first station attenuation regulator.

6. A system as claimed in claim 2 wherein said second terminal station further comprises means for permitting said second pilot signal to serve as a reference with respect to the upper limit of said high-frequency band.

7. A system as claimed in claim 2 wherein each of said stations further comprises means for adjusting the output amplitude of said second pilot signal to be substantially an equal constant.

8. A system as claimed in claim 2 wherein each of said attenuation regulators comprises a post regulator for said low-frequency band and a preregulator for said high-frequency band; and each of said slope regulators comprises a preregulator for said low-frequency band and a post regulator for said high-frequency band.

PO-1050
(5/69)

UNITED STATES PATENT OFFICE
CERTIFICATE OF CORRECTION

Patent No. 3,612,771 Dated October 12, 1971

Inventor(s) PAUL VICTOR CANIQUIT

It is certified that error appears in the above-identified patent and that said Letters Patent are hereby corrected as shown below:

col. 3, lines 36-37, cancel "the level of $P_2$ is equal to that of the low-pass filter 37";

line 45, cancel "$R_{n11}$" and insert -- $R_{n-1}$ --;

Signed and sealed this 17th day of September 1974.

(SEAL)
Attest:

McCOY M. GIBSON JR.
Attesting Officer

C. MARSHALL DANN
Commissioner of Patents